J. REGESTER.
Street-Washing Plug.
No 2,004. Reissued June 20, 1865.
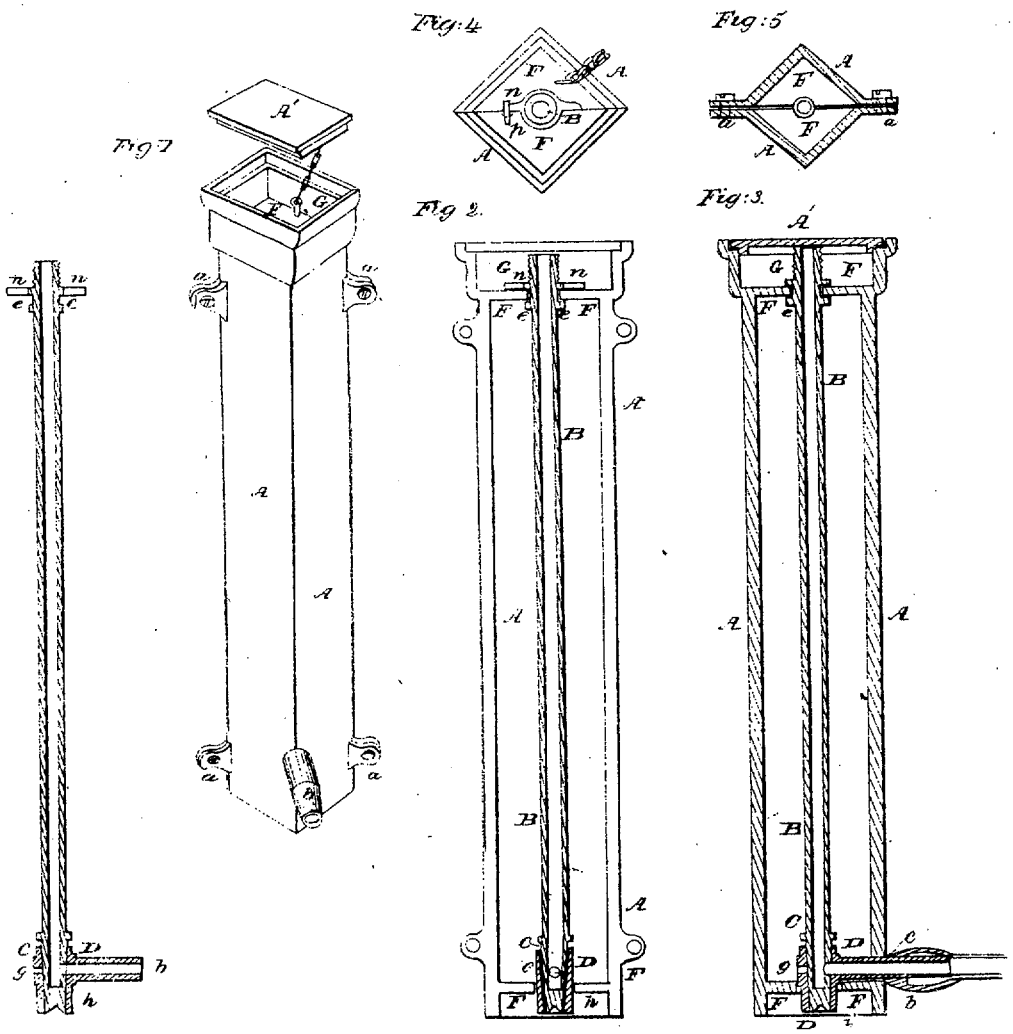
Witnesses:
R. G. Gumbert
C. Schafer

BEST AVAILABLE COPY

UNITED STATES PATENT OFFICE.

JOSHUA REGESTER, OF BALTIMORE, MARYLAND.

IMPROVEMENT IN STREET-WASHERS.

Specification forming part of Letters Patent No. 32,893, dated July 23, 1861; Reissue No. 2,664, dated June 20, 1865.

DIVISION No. 1.

*To all whom it may concern:*

Be it known that I, JOSHUA REGESTER, of Baltimore city, State of Maryland, have invented a new and useful Street-Washer; and I do hereby declare that the following is a full, clear, and exact description of that part of my invention which relates to Division No. 1, reference being had to the accompanying drawings, making a part of this specification, in which—

Figure 1 is a perspective view of my street-washer complete. Fig. 2 is an elevation of one of the sections of the case and a diametrical section through the discharge-pipe and stop-cock. Fig. 3 is a vertical longitudinal section through both sections of the street-washer case and its discharging rod and cock. Fig. 4 is a top view of the street-washer with the cover removed. Fig. 5 is a horizontal section through the street-washer. Fig. 6 is a diametrical section through the hollow key-rod or discharge-pipe and stop-cock.

Similar letters of reference indicate corresponding parts in the several figures.

The invention which forms the subject of this division is intended to remedy an objection which has hitherto existed in the use of contrivances for supplying water from street-mains, or the branch pipes thereof, for washing sidewalks, watering streets, and for various other purposes. In order to make a connection of a section of hose with a service-pipe beneath the surface of the ground, so that water can be obtained when desired, a stop-cock is applied to the pipe, and this cock incased by means of wooden boxes with open bottoms, boxes made of brick or stone work, or metallic boxes with open bottoms adapted to fit over the pipe leading from the cocks, which cases are used for admitting access to the cocks when necessary to repair them or to make connections with them. These boxes are usually covered for the purpose of preventing dirt from falling into them and covering the cock-plugs. Another plan has been to use a tube extending from the cock and forming the plug thereof to the surface of the ground, where it was steadied by connecting it to the case. By turning such a pipe the water could be obtained or cut off at pleasure.

The objection which I desire to remedy by my invention arises in consequence of the undulations of the earth surrounding the cases, caused by its frequent freezing and thawing, which gradually lifts the cases and leaves their upper ends projecting above the surface of the ground or sidewalk, to the great annoyance of passers. When discharge-pipes or key-rods connecting with the cock-plugs are used, these are parted from the cocks in consequence of the upheaving of the cases, and the water allowed to escape.

The object of my invention is to inclose a stop-cock within a metallic case of any suitable form in such manner that the cock and case are united together and are moved together when they or the earth surrounding them are affected by frost, said case being also so constructed that it serves to center as well as to support and to confine in place the stop-cock and the attachments which are employed for operating it, as will be hereinafter described.

To enable others skilled in the art to understand my invention, I will describe one mode of carrying it into effect.

In the accompanying drawings, A A represent two halves or sections of a cast-iron box, which are secured together by means of bolts passing through the lugs *a a*, as shown in Fig. 1. This box may be made of a rectangular or other shape, and it is provided with collars F and F, which are located, respectively, near the top and bottom of the box. The top of this box may be made flaring, if desired, and provided with a seat for the cap or cover A′, as shown in Figs. 1, 2, and 3, for the purpose of excluding dirt from the interior of the box and preventing persons from tampering with the cock. B is a tube, to the lower end of which the key C of the stop-cock D is attached. The upper end of this tube is furnished with catches, as shown in Fig. 4, to turn it by means of a wrench, so as to let on and off the water. The extreme upper end of this tube B has a thread cut on it for hose attachment to wash the pavement, clean the windows, or sprinkle the street, as may be required. The projecting portion *b* of the stop-cock passes through a hole, *c*, which is made through the side of the case A, and is intended to receive and form a connection with the service pipe, as indicated in red in Fig. 3, and also to prevent the cock from turning when it is confined within the case or box A. A waste-hole, *g*, is made through the cock opposite the pipe *b* to allow the water in the tube B to run out when the water is turned off to prevent freezing. The movement of the catches shown in Fig. 4 is so adjusted as to give one-half turn of the rod or pipe B, which will either turn the water on and the waste off, or vice versa. In the position shown in Fig. 3 of the drawings the water is turned on, flowing in the direction indicated by the arrows, and the waste is turned off. The waste-opening and the main-opening can never be open at the same time when the cock is incased.

The cock is constructed with an extension, *h*, which is received through the opening at the bottom of the case A, and surrounded by the collar-bearing F, as clearly shown in Figs. 2 and 3, which collar incloses the cock and also centers it with its case.

The upper end of the pipe B is constructed with an annular groove, *e*, which is adapted to receive the collar F at the upper end of the case, which collar forms a bearing for the pipe B, and also centers this pipe within its case, at the same time prevents the pipe from being lifted out of its socket in the stop-cock tube.

The stop-cock and its discharging-rod and the case which surrounds these parts are all so constructed that they can be very quickly put together, and also so that in the act of securing together the sections constituting the case the stop-cock and its rod will be confined in their proper place ready for use.

By my invention it will be seen that I secure the stop-cock, together with the discharging-rod, within the case A, and prevent any liability of injury to the parts by displacement of the earth surrounding the case when sunk into the ground. The parts above described being secured permanently together, and then secured to the service-pipe beneath the surface of the ground, this pipe is made to hold the case in its proper position.

Having thus described my invention, what I claim as new, and desire to secure by Letters Patent, is—

1. So applying a stop cock within a metallic case that the cock and case are united together, and the cock and its key-rod or discharge-pipe supported permanently in position within the case, substantially as described.

2. A stop cock case for street-washers, having an upper and a lower support, which serve to sustain and center the cock and key-rod or discharge-pipe applied therein to turn the water on and off, substantially as described.

JOSHUA REGESTER.

Witnesses:
JAMES FLYNN,
SAML. W. REGESTER.